(12) United States Patent
Weber et al.

(10) Patent No.: US 8,222,342 B2
(45) Date of Patent: Jul. 17, 2012

(54) BLENDS FROM BRANCHED POLYARYL ETHERS AND HYDROPHILIC POLYMERS

(75) Inventors: Martin Weber, Maikammer (DE); Christian Maletzko, Altrip (DE); Qian Yang, Singapore (SG); Tai-Shung Chung, Ann Arbor, MI (US)

(73) Assignee: BASF SE, Ludwigshafen (DE)

( * ) Notice: Subject to any disclaimer, the term of this patent is extended or adjusted under 35 U.S.C. 154(b) by 75 days.

(21) Appl. No.: 12/677,022

(22) PCT Filed: Aug. 27, 2008

(86) PCT No.: PCT/EP2008/061238
§ 371 (c)(1),
(2), (4) Date: Mar. 8, 2010

(87) PCT Pub. No.: WO2009/030620
PCT Pub. Date: Mar. 12, 2009

(65) Prior Publication Data
US 2010/0197859 A1  Aug. 5, 2010

(30) Foreign Application Priority Data
Sep. 6, 2007 (EP) ..................... 07017463

(51) Int. Cl.
*C08G 63/91* (2006.01)
(52) U.S. Cl. ............. 525/50; 525/54.3; 525/56; 525/60; 525/132
(58) Field of Classification Search ............... 525/54.3, 525/50, 56, 60, 132
See application file for complete search history.

(56) References Cited

U.S. PATENT DOCUMENTS

| 3,960,815 | A  | 6/1976  | Darsow et al. |
| 5,543,465 | A  | 8/1996  | Bell et al. |
| 7,601,771 | B2 | 10/2009 | Schmidt et al. |
| 2005/0220841 | A1 | 10/2005 | DeWitt et al. |
| 2006/0155097 | A1 | 7/2006  | Weber et al. |

FOREIGN PATENT DOCUMENTS

| DE | 2305413 | A1 | 8/1974 |
| DE | 102005001599 | A1 | 7/2006 |
| EP | 0376347 | A2 | 7/1990 |
| EP | 0615778 | A1 | 9/1994 |
| EP | 0509663 | B3 | 6/2000 |
| EP | 1681311 | A1 | 7/2006 |
| WO | WO-2004/005391 | A1 | 1/2004 |
| WO | WO-2007/035402 | A2 | 3/2007 |
| WO | WO-2008/063719 | A1 | 5/2008 |
| WO | WO-2008/066974 | A1 | 6/2008 |
| WO | WO 2009/0127614 | | 10/2009 |

OTHER PUBLICATIONS

Savariar, S., et al., "Polysulfone with lower levels of cyclic dimer: Use of MALDITOF in the study of cyclic oligomers," Desalination, 2002, vol. 144, pp. 15-20.
Weber, M., et al., "Synthesis and characterisation of branched polyarylethers," Macromol. Symp., 2003, vol. 199, pp. 243-252.
U.S. Appl. No. 13/125,898, filed Apr. 25, 2011, Weber et al.
U.S. Appl. No. 12/666,106, filed Dec. 22, 2009, Weber et al.
U.S. Appl. No. 12/306,152, filed Dec. 22, 2008, Dienes et al.

*Primary Examiner* — Edward Cain
(74) *Attorney, Agent, or Firm* — Connolly Bove Lodge & Hutz LLP

(57) ABSTRACT

The present invention provides polymer blends comprising the components
(a) from 40% to 95% by weight of at least one polyaryl ether copolymer constructed of
  (a1) from 50% to 99.9% by weight of building units of the general formula I

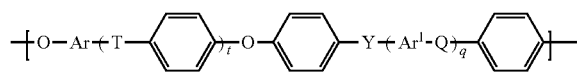

(I)

and from 0% to 40% by weight of further building units II selected from segments of one or more thermoplastic polymers, and
  (a2) from 0.1% to 10% by weight of at least one crosslinker V having at least three hydroxyl functionalities,
  the at least one crosslinker V being present in component (a) in converted form and the sum total of % by weight for (a1) and (a2) being 100% by weight,
and
(b) from 5% to 60% by weight of at least one hydrophilic polymer selected from polyvinylpyrrolidone, polyvinylpyrrolidone copolymers, polyethylene glycol, polypropylene glycol, copolymers of ethylene glycol and propylene glycol, water-soluble cellulose derivatives, polyamide, polyvinyl acetate and polyvinyl alcohol,
where the sum total of % by weight for components (a) and (b) is 100% by weight. The present invention also provides combinations of distinct components (a) and (b) for conjoint use. The invention further provides polymer membranes comprising the aforementioned polymer blends and also a process for their production and the use of the polymer membranes for producing dialysis filters. The present invention also provides dialysis filters comprising the aforementioned hollow fiber membranes.

19 Claims, No Drawings

BLENDS FROM BRANCHED POLYARYL ETHERS AND HYDROPHILIC POLYMERS

CROSS-REFERENCE TO RELATED APPLICATIONS

This application is a national stage application (under 35 U.S.C. §371) of PCT/EP2008/061238, filed Aug. 27, 2008, which claims benefit of European application 07017463.6, filed Sep. 6, 2007.

BACKGROUND OF THE INVENTION

The present invention provides polymer blends comprising the components
(a) from 40% to 95% by weight of at least one polyaryl ether copolymer constructed of
 (a1) from 50% to 99.9% by weight of building units of the general formula I

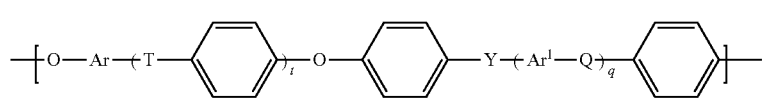

having the following meanings:
t, q: independently 0, 1, 2 or 3,
Q, T, Y: each independently a chemical bond or group selected from —O—, —S—, —SO$_2$—, S=O, C=O, —N=N—, —R$^a$C=CR$^b$—, —CR$^c$R$^d$—, where R$^a$ and R$^b$ are each independently a hydrogen atom or a C$_1$-C$_{12}$-alkyl group and R$^c$ and R$^d$ are each independently a hydrogen atom or a C$_1$-C$_{12}$-alkyl, C$_1$-C$_{12}$-alkoxy or C$_6$-C$_{18}$-aryl group, at least one of Q, T and Y being other than —O— and at least one of Q, T and Y being —SO$_2$—, and
Ar, Ar$^1$: independently C$_6$-C$_{18}$-arylene, and
from 0% to 40% by weight of further building units II selected from segments of one or more thermoplastic polymers, and
(a2) from 0.1% to 10% by weight of at least one crosslinker V having at least three hydroxyl functionalities,
  the at least one crosslinker V being present in component (a) in converted form and the sum total of % by weight for (a1) and (a2) being 100% by weight,
and
(b) from 5% to 60% by weight of at least one hydrophilic polymer selected from polyvinylpyrrolidone, polyvinylpyrrolidone copolymers, polyethylene glycol, polypropylene glycol, copolymers of ethylene glycol and propylene glycol, water-soluble cellulose derivatives, polyamide, polyvinyl acetate and polyvinyl alcohol,
where the sum total of % by weight for components (a) and (b) is 100% by weight.

The present invention also provides combinations of distinct components (a) and (b) for conjoint use. The invention further provides polymer membranes comprising the aforementioned polymer blends and also a process for their production and the use of the polymer membranes for producing dialysis filters. The present invention also provides dialysis filters comprising the aforementioned hollow fiber membranes.

Polyaryl ethers belong to the group of high performance thermoplastics and find utility in very demanding applications owing to their high thermal and chemical resistance, see G. Blinne, M. Knoll, D. Müller, K. Schlichting, Kunststoffe 75, 219 (1985), E. M. Koch, H.-M. Walter, Kunststoffe 80, 1146 (1990) and D. Döring, Kunststoffe 80, 1149 (1990).

Branched polyaryl ethers were developed to extend the given performance spectrum of polyaryl ethers. German Offenlegungsschrift DE-A 2305413 discloses branched polyaryl ether sulfones having, compared with linear polyaryl ether sulfones, a lower susceptibility to stress corrosion cracking, improved resistance to unsaturated polyester resins and also reduced flammability.

In Macromolecular Symposia 2003, 199, 243-252 a paper about the synthesis and characterization of branched polyaryl ethers discloses that the use of branched polyether sulfones generally improves the flowabilities of polyether sulfones, but worsens mechanical properties, such as toughness for example.

Owing to their low hydrophilicity and hence good resistance to hydrolysis, linear polyaryl ethers have for many years been used as membrane materials. For instance, S. Savariar et al., Desalination 144 (2002) 15 to 20 describe the use of polysulfone for producing dialysis membranes. Since polysulfone absorbs relatively little water, such dialysis membranes are typically produced using a hydrophilic polymer, for example polyvinylpyrrolidone (PVP), as an additive.

DE-A 10 2005 001 599 describes functionalized, branched polyaryl ether copolymers comprising sulfonated and non-sulfonated units. The sulfonated polyaryl ether copolymers are produced by sulfonation of the corresponding branched polyaryl ether copolymers. The reference mentions the use of the sulfonated copolymers for producing membranes. It also mentions polymer blends of the aforementioned sulfonated polyaryl ether copolymers and numerous blending partners, including polyvinylpyrrolidone. However, DE-A 10 2005 001 599 neither discloses blends of nonsulfonated branched polyaryl ethers nor discusses the particular requirements for use in the production of hollow fiber membranes.

The production of hollow fiber membranes for dialysis modules imposes particular requirements on any polymeric material. These are in particular the separation performance and the molecular weight cutoff and therefore the ability to filter out certain toxins in dialysis, and also a high durability under the conditions of sterilization and prolonged permanence of membrane properties.

For instance, EP 0509663 B2 describes dialysis modules having selectively permeable hollow fiber membranes based on a blend of polyether sulfone and a hydrophilic polymer such as for example polyvinylpyrrolidone or polyethylene glycol. EP 0615778 A1 discloses a process for production of hydrophilic membranes by using hydrophobic polymers such as polyether sulfones and of hydrophilic polymers by using polyvinylpyrrolidone.

However, mechanical properties in sustained use, proccessability in relation to production, and separation performance, in particular the molecular weight cutoff, are not always satisfactory for the materials used in existing dialysis membranes.

BRIEF SUMMARY OF THE INVENTION

The present invention has for its object to provide polymer blends having a reduced molecular weight cutoff compared with the existing polymer blends in dialysis membranes. In addition, the glass transition temperature of the polymer blend should be raised. At the same time, durability under the conditions of sterilization and also chemical robustness in sustained use should be satisfactory. In addition, the processability of the polymer blend in relation to production by wet spinning should be improved. The present invention further has for its object to provide a process for producing polymer membranes, in particular hollow fiber membranes for dialysis filters, by using the aforementioned polymer blends.

We have found that the aforementioned objects are achieved by the polymer blends of the present invention and the process of the present invention.

DETAILED DESCRIPTION OF THE INVENTION

Component (a)

In accordance with the present invention, the polymer blend comprises as component (a) from 40% to 95% by weight of at least one polyaryl ether copolymer constructed of (a1) from 50% to 99.9% by weight of building units of the general formula I

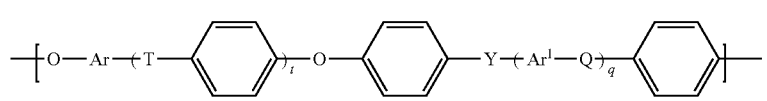

(I)

having the following meanings:

t, q: independently 0, 1, 2 or 3,

Q, T, Y: each independently a chemical bond or group selected from —O—, —S—, —SO$_2$—, S=O, C=O, —N=N—, —R$^A$C=CR$^b$, —CR$^c$R$^d$—, where R$^a$ and R$^b$ are each independently a hydrogen atom or a C$_1$-C$_{12}$-alkyl group and R$^c$ and R$^d$ are each independently a hydrogen atom or a C$_1$-C$_{12}$-alkyl, C$_1$-C$_{12}$-alkoxy or C$_6$-C$_{18}$-aryl group, where R$^c$ and R$^d$ alkyl, alkoxy or aryl can be substituted independently by fluorine and/or chlorine or where R$^c$ and R$^d$, combine with the carbon atom linking them to form C$_3$-C$_{12}$-cycloalkyl optionally substituted by one or more C$_1$-C$_6$-alkyl groups, at least one of Q, T and Y being other than —O— and at least one of Q, T and Y being —SO$_2$—, and Ar, Ar$^1$: independently C$_6$-C$_{18}$-arylene optionally substituted by C$_1$-C$_{12}$-alkyl, C$_6$-C$_{18}$-aryl, C$_1$-C$_{12}$-alkoxy or halogen, and from 0% to 40% by weight of further building units II selected from segments of one or more thermoplastic polymers, and (a2) from 0.1% to 10% by weight of at least one crosslinker V having at least three hydroxyl functionalities, the at least one crosslinker V being present in component (a) in converted form and the sum total of % by weight for (a1) and (a2) being 100% by weight.

Q, T and Y can therefore each independently be a chemical bond or one of the abovementioned atoms or groups, in which case "a chemical bond" is to be understood as meaning that, in this case, the left-adjacent and right-adjacent groups are directly linked to each other via a chemical bond. In accordance with the present invention, at least one element of Q, T and Y is other than —O— and at least one element from Q, T and Y is —SO$_2$—. In a preferred embodiment, Q, T and Y are each independently —O— or —SO$_2$—.

Preferred C$_1$-C$_{12}$-alkyl groups comprise linear and branched, saturated alkyl groups having from 1 to 12 carbon atoms. The following radicals may be mentioned in particular: C$_1$-C$_6$-alkyl, such as methyl, ethyl, n-propyl, i-propyl, n-butyl, sec-butyl, 2- or 3-methylpentyl and longer-chain radicals such as unbranched heptyl, octyl, nonyl, decyl, undecyl, lauryl and the singly or multiply branched analogs thereof.

When Ar and/or Ar$^1$ is/are substituted with C$_1$-C$_{12}$-alkoxy, especially the above-defined alkyl groups having from 1 to 12 carbon atoms are useful as alkyl in the alkoxy groups. Suitable cycloalkyl radicals comprise in particular C$_3$-C$_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, cyclopentylpropyl, cyclopentylbutyl, cyclopentylpentyl, cyclopentylhexyl, cyclohexylmethyl, cyclohexyldimethyl, cyclohexyltrimethyl.

Useful C$_6$-C$_{18}$-arylene groups Ar and Ar$^1$ include in particular phenylene groups, especially 1,2-, 1,3- and 1,4-phenylene, naphthylene groups, especially 1,6-, 1,7-, 2,6- and 2,7-naphthylene, and also the bridging groups derived from anthracene, phenanthrene and naphthacene. Preferably, Ar$^1$ is unsubstituted C$_6$-C$_{12}$-arylene, i.e., phenylene, especially 1,2-, 1,3- or 1,4-phenylene, or naphthylene.

The polyaryl ether copolymers of the present invention are produced using the corresponding dihydroxy and dihalogen compounds, preferably the chlorine or fluorine compounds, as monomers. An example is the reaction of dichlorodiphenyl sulfone with dihydroxydiphenyl sulfone and hydroquinone in the appropriate ratios in a polycondensation reaction involving concurrent release of hydrogen chloride.

The molar ratio of monomers having hydroxyl functionalities to monomers having halogen functionalities is in the range from 0.9:1.1 to 1.1:0.9, preferably in the range from 0.95:1.05 to 1.05:0.95 and more preferably 1:1. When various monomers having hydroxyl functionalities or having halogen functionalities are used, the respective sum totals of the molar quantities are considered.

It is particularly preferable to conduct the reaction of the monomers in aprotic polar solvents in the presence of anhydrous alkali metal carbonate, in particular sodium carbonate, potassium carbonate, calcium carbonate or mixtures thereof, very particular preference being given to potassium carbonate, in particular potassium carbonate having a volume-weighted average particle size of less than 100 micrometers, determined with a particle size measuring instrument in a suspension in N-methyl-pyrrolidone. A particularly preferred combination is N-methylpyrrolidone solvent with potassium carbonate base.

The reaction of the suitable monomers is conducted at a temperature of 80 to 250° C., preferably 100 to 220° C. The reaction is conducted for 2 to 12 h, preferably 3 to 8 h. After the polycondensation reaction has ended, the reaction mixture can be admixed with a monofunctional alkyl or aryl halide, for example C$_1$-C$_6$-alkyl chloride, bromide or iodide, preferably methyl chloride, or benzyl chloride, bromide or iodide or mixtures thereof. These compounds react with the hydroxyl groups at the ends of the macromolecules and thus form the starting and end pieces of the macromolecules.

Reaction in the melt is likewise preferable. The polycondensation in the melt is conducted at a temperature of 140 to 290° C., preferably 150 to 280° C.

Preferred building units of the general formula I in the polyaryl ethers of the present invention comprise at least one of the following structural repeat units Ia to Io:

comprise from 0% to 40% by weight of further building units II, which are selected from segments of one or more thermoplastic polymers.

Component (a1) may comprise not only random copolymers but also block copolymers comprising polyaryl ether segments and segments of other thermoplastic polymers. The number average molecular weights of the blocks or of the graft arms in the copolymers generally range from 1000 to 30 000 g/mol. Building units II are preferably segments of polya-

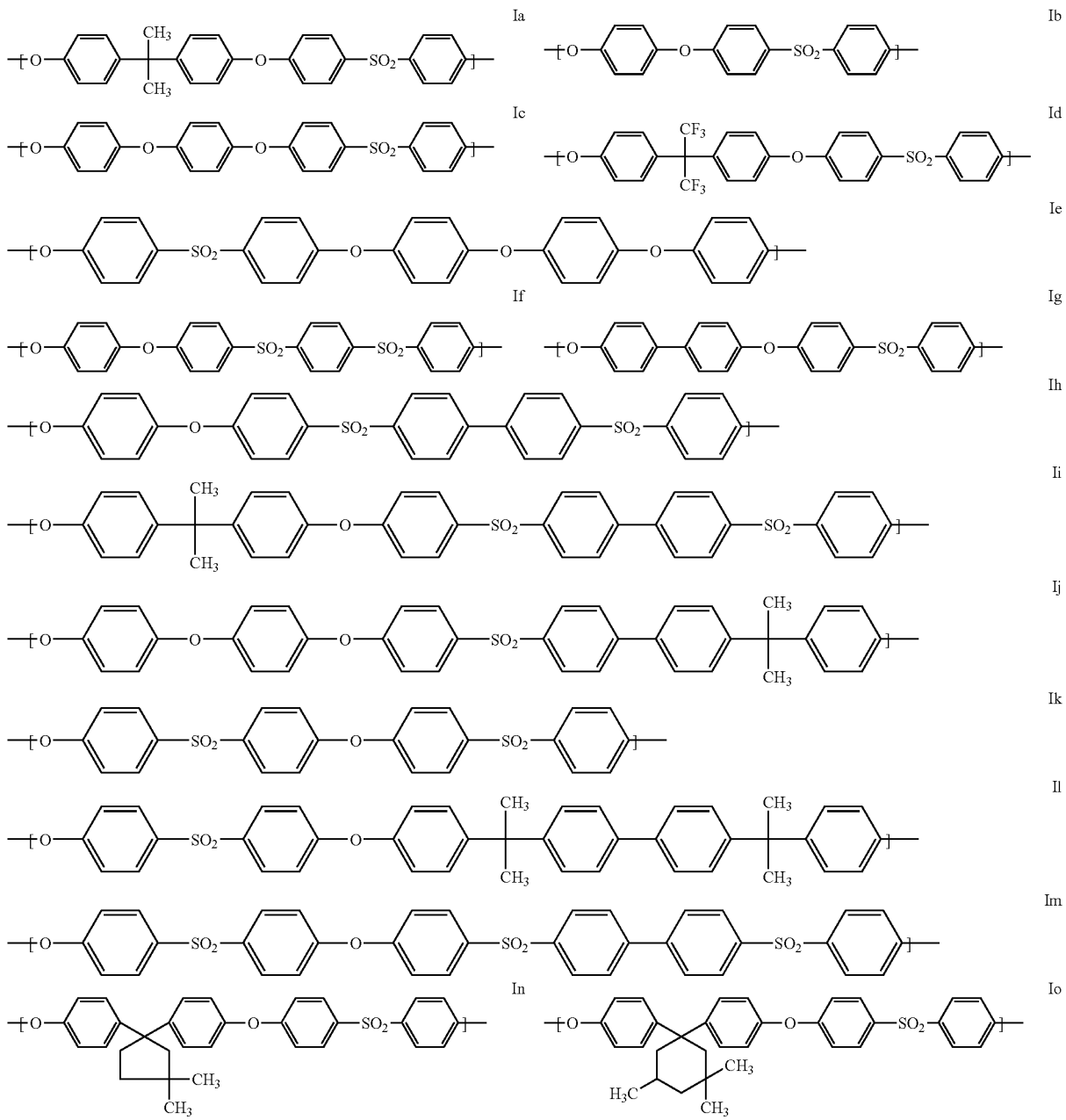

As well as the preferred building units Ia to Io, preference is also given to building units in which one or more 1,4-dihydroxyphenyl units are replaced by resorcinol or dihydroxynaphthalene units.

In accordance with the present invention, component (a1) as well as building units of the general formula I may further mides, polyesters, aromatic polycarbonates, polyester carbonates, polysiloxanes, polyimides or polyether imides. The blocks of different structures may form an alternating or random arrangement in the copolymers.

In a first preferred embodiment, however, component (a) is constructed of 90% to 99.9% by weight of building units of the general formula (I) and from 0.1% to 10% by weight of component (a2), i.e., component (a1) does not contain any further building units II.

In a further preferred embodiment, the polyaryl ether copolymer of component (a) is constructed of building units of the general formula (I) and of further building units II and also of component (a2). When component (a1) as well as building units of the general formula I further comprises further building units II based on thermoplastic polymers, then component (a1) preferably comprises 50% to 89.9% by weight and especially 50% to 79.9% by weight of building units of the general formula I and from 10% to 40% by weight and especially from 10% to 30% by weight of building units II.

Ar in one preferred embodiment is derived from an electron-rich, aromatic substance susceptible to an electrophilic attack and preferably selected from the group consisting of hydroquinone, resorcinol, dihydroxynaphthalene, especially 2,7-dihydroxy-naphthalene, and 4,4'-bisphenol.

In accordance with the present invention, component (a) as well as component (a1) is further constructed of (a2) from 0.1% to 10% by weight of at least one crosslinker V having at least three hydroxyl functionalities and being present in the polymer in converted form.

Branching of copolymer main chains is obtained according to the present invention by component (a), in addition to the above-described component (a1), comprising as further component (a2) from 0.1% to 10% by weight, preferably from 0.5% to 7.5% by weight, more preferably from 1.0% to 6.0% by weight and most preferably from 1.5% to 2.5% by weight, all based on the total weight of component (a), of at least one crosslinker V in converted form, said crosslinker V comprising at least 3 hydroxyl functionalities.

Crosslinkers V are therefore present in component (a) in polymeric form; that is, through reaction of the hydroxyl groups they are present as a constituting part of the polyaryl ether copolymer. Because the hydroxyl functionality is at least three, the polyaryl ether copolymers of component (a) are branched.

Since the crosslinker V is present in the polymer in converted form, the crosslinker V in converted form is derived from compounds having at least three hydroxyl functionalities. The crosslinker V in converted form thus identifies sites of crosslinking in the polymer which are attached to polymer chains via three or more oxygen atoms. In a further embodiment, therefore, an analogous compound V' can be used as a starting compound which comprises three or more hydroxyl-reactive groups, especially F or Cl, in place of the at least three hydroxyl functionalities.

These crosslinkers V are added in the polycondensation to produce the polyaryl ether copolymers and are incorporated in the polymer main chain like the dihydroxy compounds. Because the crosslinkers V still have at least one free hydroxyl function, condensation of a suitable monomer with this at least one hydroxyl function gives rise to at least one branching of the polymer main chain. Useful crosslinkers V for the purposes of the present invention may also have four hydroxyl functionalities in monomeric form, so that, after incorporation in the polymer main chain, there are still two hydroxyl functions available for branching of the main chain.

The degree of branching of the present invention's polyaryl ether copolymers of component (a) can be controlled via the amount of the crosslinkers V which have at least three hydroxyl functions in monomeric form, and via the number of hydroxyl functions present, which preferably ranges from three to five.

The crosslinkers V are preferably wholly or partly aromatic compounds. Preferred crosslinkers V have at least three hydroxyl groups linked to aromatic rings; i.e., they have at least three phenolic hydroxyl groups.

Crosslinkers V in monomeric form which are particularly suitable are:

phloroglucinol, 4,6-dimethyl-2,4,6-tri(4-hydroxyphenyl) heptene-2(=trimeric isopropenylphenol), 4,6-dimethyl-2,4, 6-tri(4-hydroxyphenyl)heptane(=hydrogenated primary isopropenylphenol), 1,3,5-tri(4-hydroxyphenyl)benzene, 1,1,1-tri(4-hydroxy-phenyl)ethane and 1,1,1-tri(4-hydroxyphenyl) propane, tetra(4-hydroxyphenyl)methane, 1,4-bis[(4',4"-dihydroxytriphenyl)methyl]benzene and 2,2-bis-[4,4'-bis-(4-hydroxy-phenyl)cyclohexyl]propane.

Particularly preferred crosslinkers V are such trihydric, or more than trihydric, phenols as are obtainable by reaction of p-alkyl-substituted monophenols onto unsubstituted o-positions with formaldehyde or formaldehyde-delivering compounds, an example being the trisphenol form from p-cresol and formaldehyde, i.e., 2,6-bis(2'-hydroxy-5'-methylbenzyl)-4-methylphenol. Useful crosslinkers V further include 2,6-bis(2'-hydroxy-5'-isopropylbenzyl)-4-isopropenylphenol and bis[2-hydroxy-3-(2'-hydroxy-5'-methyl-benzyl-5-methylphenyl]methane.

Useful phenols having at least three hydroxyl functionalities further include those having halogen atoms as well as phenolic hydroxyl groups, examples being the halogen-containing trihydroxyaryl ethers of the formula (VI)

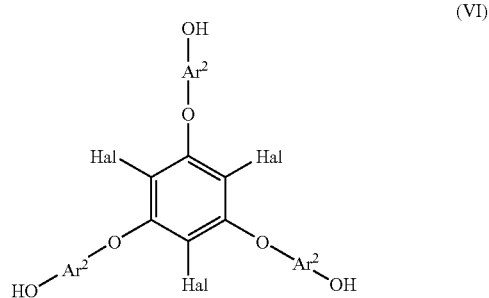

(VI)

where $Ar^2$ is a mono- or polynuclear bivalent aromatic radical and Hal is chlorine or bromine. Examples of such compounds are:
1,3,5-tris(4-hydroxyphenoxy)-2,4,6-trichlorobenzene,
1,3,5-tris[4-(4-hydroxyphenylisopropyl)phenoxy]-2,4,6-trichlorobenzene,
1,3,5-tris[4-(4-hydroxy)biphenoxy]-2,4,6-trichlorobenzene,
1,3,5-tris[4-(4-hydroxyphenylsulfonyl)phenoxy]-2,4,6-trichlorobenzene and
1,3,5-tris[4-(4-hydroxyphenylisopropyl)phenoxy]-2,4,6-tribromobenzene.

The preparation of these compounds is described in German Offenlegungsschrift 1 768 620.

In one particularly preferred embodiment, crosslinker V is selected from 1,1,1-tris(4-hydroxyphenyl)ethane (VII)

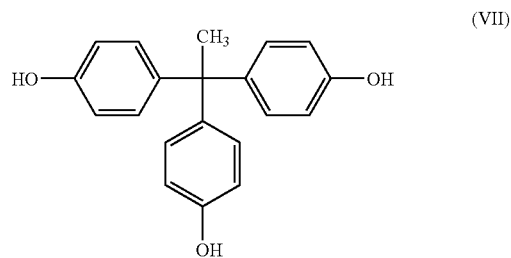

(VII)

and compounds derived from (VII). It is very particularly preferable for crosslinker V to be selected from 1,1,1-tris(4-hydroxyphenyl)ethane.

The polyaryl ether copolymers are purified by conventional methods, for example recrystallization or washing with suitable solvents in which the polyaryl ether copolymers of the present invention are preferably very largely insoluble.

Weight average molecular weights Mw for the polyaryl ether copolymers of the present invention preferably range from 10 000 to 150 000 g/mol, in particular from 15 000 to 120 000 g/mol and more preferably from 18 000 to 100 000 g/mol.

Viscosity numbers for the polyaryl ether copolymers of the present invention, measured in 1% solution in N-methylpyrrolidone at 25° C., preferably range from 30 to 200 ml/g, in particular from 35 to 190 ml/g and more preferably from 40 to 180 ml/g.

Component (b)

In accordance with the present invention, component (b) comprises from 5% to 60% by weight of at least one hydrophilic polymer selected from polyvinylpyrrolidone, polyvinylpyrrolidone copolymers, polyethylene glycol, polypropylene glycol, copolymers of ethylene glycol and propylene glycol, water soluble cellulose derivatives, polyamide, polyvinyl acetate and polyvinyl alcohol. The hydrophilic polymers of component (b) are preferably water-soluble or water-swellable.

Polyvinylpyrrolidone refers to the homopolymer of N-vinylpyrrolidone. Polyvinylpyrrolidone copolymers herein comprise copolymers of N-vinylpyrrolidone with one or more comonomers. The polymer blend preferably comprises as component (b) from 5% to 60% by weight of at least one polymer selected from polyvinylpyrrolidone and polyvinylpyrrolidone copolymers.

The vinylpyrrolidone copolymers preferably have a vinylpyrrolidone content of at least 20% by weight based on the total weight of the vinylpyrrolidone copolymer. Useful comonomers include all monomers free-radically copolymerizable with N-vinylpyrrolidone.

Preferably, the at least one polyvinylpyrrolidone copolymer is constructed of (b1) from 30% to 100% by weight and especially from 50% to 100% by weight of a monomeric building unit as per formula (III)

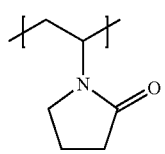

(III)

and (b2) from 0% to 70% by weight and especially from 0% to 50% by weight of further monomeric building units, the sum total of the weight %ages for the building units (b1) and (b2) being 100% by weight. A polyvinylpyrrolidone copolymer having 100% by weight of monomeric building units (III) corresponds to polyvinylpyrrolidone.

When comonomers (b2) are used, the number of comonomers in the vinylpyrrolidone copolymer is preferably in the range from 1 to 4 and especially in the range from 1 to 2.

Useful comonomers include for example N,N-dimethylaminomethyl(meth)acrylate, N,N-diethylaminomethyl(meth)acrylate, N,N-dimethylaminoethyl(meth)acrylate, N,N-diethylaminoethyl(meth)acrylate, N-[3-(dimethylamino)propyl]methacrylamide and N-[3-(dimethylamino)propyl]acrylamide.

Useful comonomers further include substituted acrylic acids and also salts, esters and amides thereof, the substituents being positioned on the carbon atoms in the two or three position of the acrylic acid and being independently selected from the group consisting of $C_1$-$C_4$-alkyl, —CN and COOH, in the last case particularly methacrylic acid, ethacrylic acid and 3-cyanoacrylic acid.

Useful comonomers further include alkyl esters of $C_1$-$C_{40}$ linear, $C_3$-$C_{40}$ branched or $C_3$-$C_{40}$ carbocyclic, vinyl or allyl halides, preferably vinyl chloride and allyl chloride, vinyl ethers, preferably methyl vinyl ether, ethyl vinyl ether, butyl vinyl ether or dodecyl vinyl ether, vinylformamide, vinylmethylacetamide, vinylamine; vinyllactams other than vinylpyrrolidone, especially vinylcaprolactam, vinyl- or allyl-substituted heterocyclic compounds, preferably vinylpyridine, vinyloxazoline and allylpyridine.

Useful comonomers further include N-vinylimidazoles where $R^9$ to $R^{11}$ each independently represent hydrogen, $C_1$-$C_4$-alkyl or phenyl:

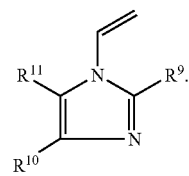

(IV)

Useful comonomers further include diallylamines of the general formula

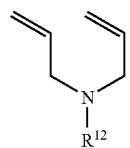

(V)

where $R^{12}$=$C_1$- to $C_{24}$-alkyl.

Preferred comonomers are acrylic acid, methacrylic acid, ethylacrylic acid, methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, methyl ethacrylate, ethyl ethacrylate, n-butyl ethacrylate, isobutyl ethacrylate, t-butyl ethacrylate, 2-ethylhexyl ethacrylate, decyl ethacrylate, stearyl (meth)acrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol(meth)acrylates, unsaturated sulfonic acids such as for example acrylamidopropanesulfonic acid; acrylamide, methacrylamide, ethacrylamide, N-methylacrylamide, N,N-dimethylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-isopropylmethacrylamide, N-dodecylmethacrylamide, 1-vinylimidazole, 1-vinyl-2-methylvinylimidazole, N,N-dimethylaminomethyl(meth)acrylate, N,N-diethylaminomethyl(meth)acrylate, N,N-dimethylaminoethyl(meth)acrylate, N,N-diethylaminoethyl(meth)acrylate, N,N-dimethylaminobutyl(meth)acrylate, N,N-diethylaminobutyl(meth)acrylate, N,N-dimethylaminohexyl(meth)acrylate, N,N-dimethylaminooctyl(meth)acrylate, N,N-dimethylaminododecyl(meth)acrylate, N-[3-(dimethylamino)propyl]-methacrylamide, N-[3-(dimethylamino)propyl]acrylamide, N-[3-(dimethylamino)butyl]methacrylamide, N-[8-(dimethylamino)octyl]methacrylamide, N-[12-(dimethylamino)dodecyl]methacrylamide, N-[3-(diethylamino)propyl]methacrylamide, N-[3-(diethylamino)propyl]acrylamide, maleic acid, fumaric acid, maleic anhydride and its monoesters, crotonic acid, itaconic acid, diallyldimethylammonium chloride, vinyl ethers (for example: methyl vinyl ether, ethyl vinyl ether, butyl vinyl ether or dodecyl vinyl ether), vinylformamide, N-vinyl-N-methylacetamide, vinylamine, methyl vinyl ketone, maleimide, vinylpyridine, vinylimidazole, vinylfuran, styrene, styrenesulfonate, allyl alcohol and mixtures thereof.

Particularly preferable comonomers are acrylic acid, methacrylic acid, maleic acid, fumaric acid, crotonic acid, maleic anhydride and its monoesters, methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, stearyl acrylate, stearyl methacrylate, N-t-butylacrylamide, N-octylacrylamide, 2-hydroxyethyl acrylate, hydroxypropyl acrylates, 2-hydroxyethyl methacrylate, hydroxypropyl methacrylates, alkylene glycol(meth)acrylates, styrene, unsaturated sulfonic acids such as for example acrylamidopropanesulfonic acid, vinylpyrrolidone, vinylcaprolactam, vinyl ethers (for example methyl vinyl ether, ethyl vinyl ether, butyl vinyl ether or dodecyl vinyl ether), vinylformamide, N-vinyl-N-methylacetamide, vinylamine, 1-vinylimidazole, 1-vinyl-2-methylimidazole, N,N-dimethylaminomethyl methacrylate and N-[3-(dimethylamino)propyl]methacrylamide; 3-methyl-1-vinylimidazolium chloride, 3-methyl-1-vinylimidazolium methosulfate, N,N-dimethylaminoethyl methacrylate, N-isopropylmethacrylamide, N-[3-(dimethylamino)propyl]methacrylamide quaternized with methyl chloride, vinylcaprolactam (VCAp), VI, 1-vinyl-3-methylimidazolium chloride (QVI), vinyl acetate (VAc), (meth)acrylamide, dimethylaminoethyl(meth)acrylate and dimethylaminoethyl(meth)acrylamide and quaternized analogs thereof, diallyldimethylammonium chloride, vinyl alcohol (by hydrolysis from vinyl acetate after polymerization), vinylformamide (VFA), vinylamine (especially by hydrolysis from VFA after polymerization), dimethylaminopropyl(meth)acrylate, dimethylaminopropyl(meth)acrylamide, (meth)acrylic acid, vinylpiperidone, N,N-dimethyl (meth)acrylamide, tert-butyl(meth)acrylamide, N-tert-octyl (meth)acrylamide, stearyl(meth)acrylamide, methyl(meth) acrylate, ethyl(meth)acrylate, butyl(meth)acrylate, tert-butyl (meth)acrylate, 2,3-dihydroxypropyl(meth)acrylate, N-isopropylacrylamide, vinyl propionate, 1-vinyl-2-methylimidazole, styrene, vinylpyridine, esters of (meth) acrylic acid and ethers of allyl alcohol and of polyethylene oxide or propylene oxide or poly(ethylene oxide-co-propylene oxide) having altogether 2 to 200 EO or PO units or EO-PO units with terminal methoxy or hydroxyl, maleic acid, fumaric acid, methyl vinyl ether, hydroxyethyl(meth)acrylate, hydroxypropyl(meth)acrylate, vinyllactams, vinyloxazolines such as vinyloxazoline, vinylmethyloxazoline, vinylethyloxazoline, acrylamidopropanesulfonic acid and allyl alcohol and also mixtures thereof.

Very particular preference for use as comonomers is given to N-vinyllactams such as N-vinylcaprolactam (VCAp), N-vinylformamide, further N-vinylimidazole (VI), 1-vinyl-3-methylimidazolium chloride (QVI), vinyl esters of aliphatic carboxylic acids such as vinyl acetate, vinyl propionate, vinyl butyrate, vinyl laurate, vinyl stearate, further (meth)acrylamide, dimethylaminoethyl(meth)acrylate and dimethylaminoethyl(meth)acrylamide and quaternized analogs thereof, and diallyldimethylammonium chloride and also mixtures thereof.

Very particularly preferred vinylpyrrolidone copolymers are finally copolymers selected from
copolymers of N-vinylpyrrolidone (VP) with vinyl acetate having a VP:VAc weight ratio of 20:80 to 80:20, in particular of 30:70 to 70:30, preferably of 40:60 to 60:40, and also having K values of 10 to 100, preferably of 20 to 50;
copolymers of VP and VI, in particular having a VP:VI weight ratio of 40:60 to 60:40; copolymers of VP and VCap, in particular having a weight ratio of 40:60 to 60:40 and having K values of 10 to 100, preferably of 20 to 60;
copolymers of VP and 1-vinyl-3-methylimidazolium chloride (preferably obtained by quaternization of 1-vinylimidazole with methyl chloride) having a VP/QVI weight ratio of 20:80 to 99:1 preferably, and the copolymers of VP and 1-vinyl-3-methylimidazolium chloride may have molecular weights of 40 000 to more than 1 000 000 daltons.

Polyvinylpyrrolidone is most preferable for use as component (b).

The weight average molecular weight of component (b) is preferably from 100 000 g/mol to 1 000 000 g/mol.

More particularly, aqueous solutions of NVP homopolymers having K values of 1 to 150, preferably K10 to K90, for example K12, K15, K 17, K25, K30, K60, K85, and K90, are also stabilized according to the present invention. The K values reported in the present invention are determined according to Fikentscher, Cellulosechemie 13, (1932) 58.

The preparation of such polyvinylpyrrolidone copolymers by free-radical polymerization can be effected by methods known per se.

The polymerization can be effected for example as a solution polymerization with suitable solvents such as water, mixtures of water and organic solvents, for example ethanol-water or isopropanol-water mixtures, or in purely organic solvents such as ethanol or isopropanol.

Production of the Polymer Blend

The present invention also provides for the production of the polymer blends of the present invention by mixing the polyaryl ether copolymers in solution with the further polymer or polymers, likewise in solution. To this end, the polyaryl ether copolymers and the corresponding polymers are mixed by dissolving in a conjoint medium, for which in particular dipolar aprotic solvents such as DMF, DMAC, NMP, DMSO, sulfolane, N-methylcaprolactam, ureas or mixtures thereof are suitable. The intimately mixed polymer blend is obtained by removing the solvent.

It is also possible to isolate the corresponding polymer blends by precipitating them from the conjoint solution. Further workup and purification of these polymer blends is carried out by methods known to one skilled in the art, for example decanting off, filtering off or centrifuging and if appropriate washing and/or drying.

Production of Membranes

The production of membranes using the polymer blends of the present invention can be effected by employing conventional steps or processes.

The membranes comprising the polymer blends of the present invention are preferably obtained by a process comprising the following steps:
(i) producing a solution of the present invention's polymer blend comprising components (a) and (b) in a solvent (C) and
(ii) separating the polymer blend from solvent (C) to form the polymer membrane.

Step (i) thus comprises producing a solution of components (a) and (b) in a solvent (C). Useful solvents are solvents in which both the components (a) and (b) are soluble, soluble being understood as meaning that at least 10% by weight, preferably at least 20% by weight and especially at least 50% by weight based on the total weight of the solution dissolve in solvent (C) at room temperature. Suitable solvents are in particular dipolar aprotic solvents.

The solution obtained in step (i) is preferably devolatilized before step (ii) is conducted. Customary, generally known methods of devolatilizing liquids are chosen by a person skilled in the art.

Preferred solvents are N-methylpyrrolidone, dimethylacetamide, dimethyl sulfoxide, dimethylformamide, acetone, acetaldehyde. Particular preference is given to N-methylpyrrolidone, dimethylacetamide, dimethyl sulfoxide and dimethylformamide.

The dissolving can take place in customary receptacles, in particular in those equipped with a stirring device and preferably a temperature-policing device. The production of a solution in accordance with step (i) of the process of the present invention is preferably effected by stirring. Components (a) and (b) can be dissolved in succession or at the same time.

The duration of step (i) can vary within wide limits. The duration of step (i) is preferably from 10 minutes to 48 hours, particularly from 10 minutes to 12 hours, more preferably from 15 minutes to 2 hours. A person skilled in the art will select the duration of step (i) such that a homogeneous solution of components (a) and (b) in solvent (C) is obtained.

Step (i) is preferably conducted at elevated temperature, in particular from 20° C. to 120° C. and preferably from 40° C. to 100° C. A person skilled in the art chooses the temperature in particular according to solvent (C).

The preferred concentration of components (a) and (b) in solvent (C) depends in particular on the nature of step (ii) and is elucidated hereinbelow.

This is followed, in step (ii), by the separation of the polymer blend from solvent (C) to form the polymer membrane.

In principle, the form of the polymer membranes can vary, in which case the polymer membranes are particularly present in the form of a sheet, in the form of a layer on a support or in the form of a fiber. In one preferred embodiment, the membranes in accordance with the present invention are hollow fiber membranes, in particular hollow fiber membranes for dialysis applications.

When the process of the present invention is used to produce hollow fiber membranes, step (ii) is preferably conducted by means of wet spinning; that is, the solution produced in step (i) is wet-spun into a fiber in step (ii). When a wet-spinning process is employed in step (ii), a dry-jet wet-spinning process is particularly preferred.

A dry-jet wet-spinning process for the purposes of the present invention comprises in step (ii) the following steps:
(ii-a) extruding the solution of step (i) from a die into a gaseous atmosphere, in particular air, optionally in the presence of a core liquid; and
(ii-b) introducing the fiber extruded in step (ii-a) into one or more coagulation baths each comprising a container and a coagulation liquid.

The special die typically to be used has a core through which preferably the core liquid is flushed during spinning. Core liquid herein is a liquid which comes into contact with the polymer solution in the core of the spinneret die. The core liquid has coagulating properties and serves to stabilize the core of the hollow fiber during the wet-spinning process.

The gap between the die and the coagulation solution is known as the dry zone and ranges preferably from 0.1 to 100 cm, in particular from 0.5 to 50 cm and preferably from 1 to 30 cm.

The structure of the pores in the hollow fiber is influenced by the one or more coagulation liquids in which component (a) and/or component (b) are preferably not, or not fully, soluble. The at least one coagulation liquid is the cause for the polymer to be spun coagulating, at least partially, in the coagulation bath in the form of a fiber.

Coagulation liquids and core liquids are preferably liquids which are fully miscible with the solvent (C), with the prerequisite that component (a) is insoluble or partially insoluble in the coagulation liquid.

Core and coagulation liquids are chosen by those skilled in the art in relation to solvent (C) such that the liquids are not only miscible but also, after spinning, separable, i.e., recoverable in pure form, preferably by distillative separation.

The core liquid used is preferably a mixture of solvent (C) and deionized water, in particular N-methylpyrrolidone and water. The mixing ratio (weight ratio) is preferably in the range from 3:1 to 1:3, more preferably in the range from 2:1 to 1:2 and in particular in the range from 1.3:1 to 1:1.

The coagulation liquids used in the coagulation baths are preferably at least one aliphatic alcohol or water or a mixture thereof. It is particularly preferable for step (ii-b) of the process according to the present invention to employ an aliphatic alcohol, in particular ethanol or isopropanol, if appropriate mixed with water, in a first coagulation bath and water in a second coagulation bath.

Components (a) and (b) are preferably employed in a water-free form in the process of the present invention. Water-free is to be understood as meaning that the water content of the solution produced in step (a) is less than 5% by weight, preferably less than 2% by weight and especially less than 1% by weight. Suitable drying techniques include those known to one skilled in the art, in particular the employment of elevated temperature and/or reduced pressure.

The solution used in step (ii) comprises the polymer blend of components (a) and (b) in an amount which is preferably in the range from 5% to 40% by weight and in particular in the range from 10% to 30% by weight, based on the total weight of the solution including solvent (C).

The weight average molecular weight of component (b) in the course of the process according to the present invention is preferably in the range from 100 000 g/mol to 1 000 000 g/mol and in particular in the range from 200 000 g/mol to 600 000 g/mol.

After steps (i) and (ii) of the process according to the present invention have been performed, the membrane is optionally subjected to a step (iii) of finishing, which is to be understood as meaning an operation comprising one or more steps selected from purification, washing and postcrosslinking.

The membranes of the present invention, in particular the hollow fiber membranes of the present invention, have high mechanical strength in sustained use. They also have a low molecular weight cutoff in ultrafiltration, in particular in dialysis.

The examples which follow elucidate the invention further without limiting it.

EXAMPLES

The viscosity number of the polyaryl ethers was determined in 1% solution of N-methylpyrrolidone at 25° C. in accordance with ISO 1628.

To determine the glass transition temperature of the polymer blends, dried polymer blends were heated from room temperature to 280° C. at a rate of 20 K/min. The glass transition temperature reported in Table 1 was determined during the second heating period. A Pyris-1 DSC instrument from Perkin-Elmer was used.

For each of the ultrafiltration experiments, 10 freeze-dried fibers 25 cm in length were bundled together. Both ends were sealed with a commercial epoxy resin. After the epoxy resin had cured, the fiber bundle was installed in the test apparatus.

Separation performance in the ultrafiltration experiments was assessed using polyethylene glycol standards having molecular weights ranging from 600 to 900 000 g/mol. In this experiment, the polymer solution flows through the hollow fibers, while electrolyte solution flows countercurrently outside the hollow fiber; that is, the inner layer of the hollow fiber membrane is the active layer. The concentration of polyethylene glycol in the starting solution was 200 ppm. The separation experiments were carried out at a pressure of $8*10^{-4}$ Pa. The pure water permeance flux (PWP) was determined for all membranes. Separation properties were determined by determining the polyethylene glycol fraction in the starting solution and in the permeate. For this, the carbon fraction was determined using an ASI-5000A type Total Organic Carbon Analyser from Shimadzu.

The separation factor R was computed according to the following formula: $R=(1-Cp/Cf)*100$, where Cf and Cp are the polyethylene glycol concentration in the starting solution feed and in the permeate, respectively.

The molecular weight cutoff (MWCO) for the purposes of the present invention is that exclusion limit where a 90% by weight separation of PEG was achieved. The results of the tests are reported in Tables 1 and 2.

Production of Polymer Blends

Component (a-1) was a branched polyaryl ether obtained by nucleophilic aromatic polycondensation of 576.16 g of dichlorodiphenyl sulfone, 485.33 g of dihydroxydiphenyl sulfone and 12.25 g of 1,1,1-tris(4-hydroxyphenyl)ethane in the presence of 290.24 g of potassium carbonate in 1000 ml of N-methylpyrrolidone (NMP). This mixture was maintained at 195° C. for 3.5 hours. After cooling to 120° C., methyl chloride was passed into the solution for 1 hour. Thereafter, the batch was diluted with 1000 ml NMP, solids were removed by filtration and the polymer was isolated by precipitation in 1:9 (w/w) NMP/water. After careful washing with water, the product was dried at 120° C. under reduced pressure for 12 h. The product had a viscosity number of 81.9 ml/g and a glass transition temperature of 226° C.

The comparative component (a-V2) was Ultrason E 6020 P from BASF, a high-viscosity linear polyether sulfone (PESU in the nomenclature ISO 1043) having a glass transition temperature of 224° C.

Component (b-1) was polyvinylpyrrolidone from Merck having a molecular weight (Mw) of 360 000 g/mol and a glass transition temperature of 176° C.

The polymer blends were produced by dissolving component (a) and polyvinylpyrrolidone (PVP) as component (b) in dimethylformamide as solvent (C). To this end, appropriate amounts of the two blending partners were produced as 5% solutions in each case. The solutions were subsequently mixed and poured into glass dishes. The solvent was gradually removed by applying reduced pressure. The temperature was then raised to 160° C. in 20° C. increments. In each increment, the samples were maintained at the respective temperature for 4 h.

TABLE 1

Composition and glass transition temperature of polymer blends

| Component | V1 | V2 | V3 | V4 | V5 | 6 | 7 | 8 | 9 | 10 |
|---|---|---|---|---|---|---|---|---|---|---|
| a-V2 [wt %] | 80 | 70 | 60 | 50 | 30 | — | — | — | — | — |
| a-1 [wt %] | — | — | — | — | — | 80 | 70 | 60 | 50 | 30 |
| PVP | 20 | 30 | 40 | 50 | 70 | 20 | 30 | 40 | 50 | 70 |
| Tg [° C.] | 190 | 186 | 182 | 181 | 178 | 203 | 200 | 199 | 195 | 187 |

Production of Hollow Fiber Membranes

The solutions to produce the hollow fiber membranes were produced as follows: First, polyaryl ether a-1 or a-V2, as component (a), was dissolved in NMP. Then, PVP, as component (b), was added to the solution until a composition of 16/10/74 wt % of (a-1/b-1/NMP) was reached. This solution was subsequently stirred at room temperature for 48 h. Before spinning, the solutions were devolatilized for 1 day.

Hollow fiber membranes were produced in the dry-jet wet-spinning process of Q. Yang, T. S. Chung, Y. E. Santoso, Journal of Membrane Science, 2007, 290, pages 153-163.

The composition of the core liquid was 55:45 parts by weight of NMP: deionized water. The distance between the spinneret die and the coagulation bath was 20 cm. A 2-stage coagulation process was employed, with isopropanol as first coagulation liquid in the first coagulation bath and water as the second coagulation liquid in the second coagulation bath. The takeoff speed of the fibers was equal to the spinning speed (8.6 cm/s). The fibers were subsequently stored in water for 3 days. To ensure complete removal of the solvent, the fibers were subsequently stored for 3 times 30 minutes in methanol and subsequently in fresh hexane. The fibers were subsequently freeze dried.

TABLE 2

Properties of hollow fiber membranes; reported composition based on polymer blend used before spinning.

|  | Run | |
|---|---|---|
|  | V11 | 12 |
| a-1 [wt %] | — | 61.5 |
| a-V2 [wt %] | 61.5 | — |
| b-1 [wt %] | 38.5 | 38.5 |
| PWP [l/m² * bar * h] | 5.43 | 6.65 |
| MWCO [g/mol] | 8420 | 5610 |

The membrane based on branched PES exhibited a higher pure water permeance flux (PWP) coupled with an improved molecular weight cutoff (MWCO).

We claim:

1. A polymer blend comprising the components:
   (a) from 40% to 95% by weight of at least one polyaryl ether copolymer constructed of
      (a1) from 50% to 99.9% by weight of building units of the general formula I $$\text{+O—Ar+T}\underset{t}{\underbrace{\text{———}}}\text{O}\underset{}{\underbrace{\text{———}}}\text{Y+Ar}^1\text{-Q}\underset{q}{\underbrace{\text{———}}}\text{+} \qquad (I)$$

having the following meanings:
   t and q: independently are 0, 1, 2 or 3,
   Q, T and Y: each independently are a chemical bond or group selected from the group consisting of —O—, —S—, —SO$_2$—, S=O, C=O, —N=N—, —R$^a$C=CR$^b$ and —CR$^c$R$^d$, where R$^a$ and R$^b$ are each independently a hydrogen atom or a C$_1$-C$_{12}$-alkyl group and R$^c$ and R$^d$ are each independently a hydrogen atom, a C$_1$-C$_{12}$-alkyl, C$_1$-C$_{12}$-alkoxy or C$_6$-C$_{18}$-aryl group, at least one of Q, T and Y being other than —O— and at least one of Q, T and Y being —SO$_2$—, and
   Ar and Ar$^1$: independently are C$_6$-C$_{18}$-arylene,
   from 0% to 40% by weight of further building units II selected from segments of one or more thermoplastic polymers, and
   (a2) from 0.1% to 10% by weight of at least one crosslinker V having at least three hydroxyl functionalities, the at least one crosslinker V being present in component (a) in converted form and the sum total of % by weight for (a1) and (a2) being 100% by weight, and
   from 5% to 60% by weight of at least one hydrophilic polymer selected from the group consisting of polyvinylpyrrolidone, polyvinylpyrrolidone copolymers, polyethylene glycol, polypropylene glycol, copolymers of ethylene glycol and propylene glycol, water-soluble cellulose derivative, polyamide, polyvinyl acetate and polyvinyl alcohol.

2. The polymer blend according to claim 1, comprising as component (b) from 10% to 60% by weight of at least one polyvinylpyrrolidone copolymer.

3. The polymer blend according to claim 1, wherein the at least one polyvinylpyrrolidone copolymer is constructed of
   (b1) from 30% to 100% by weight of a monomeric building unit as per formula (III)

$$\text{(III)}$$

and
   (b2) from 0% to 70% by weight of further monomeric building units,
   where the sum total of % by weight for building units (b1) and (b2) is 100% by weight.

4. The polymer blend according to claim 1, wherein the weight average molecular weight of component (b) is in the range from 100,000 g/mol to 1,000,000 g/mol.

5. The polymer blend according to claim 1, wherein crosslinker V comprises at least one organic compound having at least three phenolic hydroxyl groups in converted form.

6. The polymer blend according to claim 1, wherein crosslinker V comprises 1,1,1-tris(4-hydroxyphenyl)ethane in converted form.

7. The polymer blend according to claim 1 wherein Q, T and Y in component (a) are independently —O— or —SO$_2$—.

8. The polymer blend according to claim 1, wherein Ar in component (a) is selected from the group consisting of 1,4-phenylene, 1,3-phenylene, naphthalene and 4,4'-bisphenylene.

9. The polymer blend according to claim 1, wherein Ar$^1$ in component (a) is phenylene or naphthylene.

10. A combination comprising as distinct parts component (a) and component (b) according to claim 1 for conjoint use.

11. A polymer membrane comprising the polymer blend according to claim 1.

12. The polymer membrane according to claim 11 being a hollow fiber membrane.

13. A process for producing a polymer membrane, which comprises
   (i) producing a solution of a polymer blend according to claim 1 in a solvent (C) and
   (ii) separating the polymer blend from the solvent (C) to form the polymer membrane.

14. The process for producing a polymer membrane according to claim 13, wherein the polymer membrane is a hollow fiber membrane.

15. The process for producing a polymer membrane according to claim 13, wherein the separating of the polymer blend and of the solvent (C) in step (ii) is effected by spinning the solution obtained in step (i).

16. The process for producing a polymer membrane according to claim 15, wherein the spinning in step (ii) of the solution obtained in step (i) is effected by dry jet wet-spinning.

17. The process according to claim 16, wherein the solution used in step (ii) comprises from 5% to 40% by weight of the polymer blend based on the total weight of the solution including the solvent (C).

18. A hollow fiber membrane obtainable by the process according to claim 13.

19. A dialysis filter comprising a hollow fiber membrane according to claim 18.

* * * * *